United States Patent
Kimura

(10) Patent No.: US 8,107,348 B2
(45) Date of Patent: Jan. 31, 2012

(54) OPTICAL PICKUP APPARATUS FOR USE ON A MULTI-LAYERED OPTICAL INFORMATION STORAGE MEDIUM

(75) Inventor: Shigeharu Kimura, Yokohama (JP)

(73) Assignee: Hitachi Media Electronics Co., Ltd., Iwate-Ken (JP)

( * ) Notice: Subject to any disclaimer, the term of this patent is extended or adjusted under 35 U.S.C. 154(b) by 27 days.

(21) Appl. No.: 12/475,886

(22) Filed: Jun. 1, 2009

(65) Prior Publication Data

US 2009/0310468 A1 Dec. 17, 2009

(30) Foreign Application Priority Data

Jun. 13, 2008 (JP) ................................. 2008-154809

(51) Int. Cl.
*G11B 7/135* (2006.01)
(52) U.S. Cl. ................................. 369/112.19
(58) Field of Classification Search ............. 369/112.17, 369/112.19
See application file for complete search history.

(56) References Cited

U.S. PATENT DOCUMENTS

| | | | | |
|---|---|---|---|---|
| 6,426,933 B1 * | 7/2002 | Jeong et al. | ............... | 369/112.17 |
| 6,563,099 B2 * | 5/2003 | Kimura et al. | ............. | 250/201.5 |
| 6,636,464 B1 * | 10/2003 | Lee et al. | ................... | 369/44.23 |
| 7,881,174 B2 * | 2/2011 | Nagai | ...................... | 369/112.17 |
| 7,907,499 B2 * | 3/2011 | Masuda et al. | ........... | 369/112.18 |
| 2007/0036058 A1 * | 2/2007 | Okamoto et al. | ........ | 369/112.06 |
| 2007/0268807 A1 | 11/2007 | Kimura et al. | | |
| 2008/0117724 A1 * | 5/2008 | Okamoto | ..................... | 369/13.3 |
| 2008/0247298 A1 | 10/2008 | Ogata | | |
| 2009/0257340 A1 * | 10/2009 | Nagata et al. | ................. | 369/121 |
| 2010/0214903 A1 * | 8/2010 | Nakai | ..................... | 369/112.23 |

FOREIGN PATENT DOCUMENTS

| | | |
|---|---|---|
| JP | 2006-344344 A | 12/2006 |
| JP | 2007-310926 A | 11/2007 |
| WO | WO 2007043663 A1 * | 4/2007 |
| WO | WO 2008013047 A1 * | 1/2008 |
| WO | WO 2009050940 A1 * | 4/2009 |

OTHER PUBLICATIONS

H. Richter et al., System Aspects of Dual-Layer Phase-Change Recording with High Numerical Aperture Optics and Blue Laser, Jpn. J. Appl. Phys. vol. 42, Feb. 2003, pp. 956-960.

* cited by examiner

*Primary Examiner* — Will J Klimowicz
*Assistant Examiner* — Mark Fischer
(74) *Attorney, Agent, or Firm* — Mattingly & Malur, P.C.

(57) ABSTRACT

An optical pickup apparatus for use on multi-layered optical information storage medium in which influences of reflected light, which result in crosstalk from adjacent layers in a multi-layered optical disk, are mitigated. In an astigmatic optical system of the optical pickup, a first composite segmented wave plate having a segmentation direction that is in the same direction as the focal line that is close to the astigmatic optical system, a second composite segmented wave plate of the same segmentation direction, and an analyzer are inserted.

9 Claims, 14 Drawing Sheets

OPTICAL PICKUP APPARATUS FOR USE ON A MULTI-LAYERED OPTICAL INFORMATION STORAGE MEDIUM

CLAIM OF PRIORITY

The present application claims priority from Japanese patent application JP 2008-154809 filed on Jun. 13, 2008, the content of which is hereby incorporated by reference into this application.

BACKGROUND OF THE INVENTION

1. Field of the Invention

The present invention relates to an optical pickup apparatus, and more particularly to a readout optical system of an optical pickup apparatus.

2. Background Art

The recording capacity of one layer of an optical disk is largely dependent on the wavelength of the semiconductor laser used and the numerical aperture (NA) of the objective lens. Recording density is greater the shorter the wavelength of the semiconductor laser is or the greater the NA is, and the capacity per layer may thus be increased. The majority of optical disk drives currently in circulation on the market are DVD (Digital Versatile Disc) drives that use red light of a wavelength in the vicinity of 650 nm and an objective lens with an NA of 0.6. However, as an optical disk drive that surpasses the recording density of a DVD, one that uses a blue-violet semiconductor laser as a light source, whose wavelength is in the vicinity of 405 nm, and an objective lens with an NA of 0.85 has been developed, and its market share is beginning to increase. Shortening the wavelength used is conceivable as a method of further increasing the recording density that is currently achieved. However, difficulty is anticipated in the development of a semiconductor laser in the ultraviolet region of wavelengths shorter than that of blue-violet light. In addition, as for increasing the NA of the objective lens, too, the limit of the NA of an objective lens in air is 1. Therefore, improving recording density by way of the NA of the objective lens is also becoming difficult.

Under such circumstances, the use of two layers is being implemented as a method of increasing the capacity of a single optical disk. Non-Patent Document 1 introduces a technique relating to phase-change disks with two layers. When laser light irradiates a two-layered optical disk, the adjacent layer is also irradiated at the same time, thereby giving rise to the problem of interlayer crosstalk. In order to mitigate this problem, interlayer spacing is increased. Since the laser light is focused and the layer that is not the target layer deviates from the focal position of the laser light, crosstalk can be reduced.

On the other hand, when interlayer spacing is widened, spherical aberration becomes a problem. The recording layers are embedded in polycarbonate, which has a refractive index that differs from that of air. Thus, spherical aberration varies with the depth from the disk surface. An objective lens is designed such that its spherical aberration becomes smaller for a particular layer. Thus, when the focal point of the laser light is shifted to a different layer, the distance of the focal point position from the surface changes, thereby causing spherical aberration. This aberration can be corrected for by placing an expander lens optical system, which ordinarily comprises two lenses, or a liquid crystal element before the objective lens. In other words, the aberration can be corrected by changing the distance between the two lenses or the phase of the liquid crystal element. However, given how the compensable range of the liquid crystal element or the movement mechanism of the lenses are to be realized within a compact optical disk drive apparatus, it would be difficult to correct for large spherical aberration. Thus, the total thickness of a plurality of layers is restricted, thereby causing the interlayer spacing to be narrower in multi-layered optical disks with a large number of layers. For this reason, in actual optical disk drive apparatuses, interlayer crosstalk is still present.

In order to reduce the above-mentioned crosstalk, according to Patent Document 1, the fact that the focal positions of the reflected light from the target layer and the reflected light from the adjacent layer differ along the optical axis when reflected light from a multi-layered optical disk is focused by a lens is utilized. Two segmented wave plates comprising a positive quarter-wave plate and a negative quarter-wave plate are used, and they are disposed before/behind each other with their segmentation directions aligned. They are disposed such that the focal position of the reflected light from the target layer falls between the two segmented wave plates. On the other hand, the focal position of the reflected light from any layer other than the target layer, which becomes stray light, is made to fall outside of the region between the two segmented wave plates. By employing such an arrangement, the polarization direction of the reflected light from the target layer can be made to differ from that of the reflected light from any other layer after traveling through the two wave plates. In order to extract only the reflected light from the target layer, an analyzer may be provided behind the two wave plates. Thus, crosstalk from other layers can be reduced. In Patent Document 2, reflected light from other layers is eliminated using two three-segment wave plates. This method is suitable for the differential push-pull method that uses three beams in order to obtain tracking error signals. However, both methods involve an operation in which the reflected light from the optical disk is first focused on the segmented wave plates, and is reverted to the shape of the beam before it was focused. Thus, an extra lens is necessary, and the apparatus inevitably becomes larger.

[Patent Document 1] JP Patent Publication (Kokai) No. 2006-344344 A

[Patent Document 2] JP Patent Publication (Kokai) No. 2007-310926 A

[Non-Patent Document 1] Jpn. J. Appl. Phys. Vol. 42 (2003) pp. 956-960

SUMMARY OF THE INVENTION

It is an object of the present invention to reduce crosstalk in a multi-layered disk without causing an increase in the size of an optical disk drive apparatus.

An outline of an optical system of a general optical pickup apparatus is shown in FIG. 2. Laser light emitted from a semiconductor laser 101 is converted into a circular collimated light beam by a collimator lens 403 and a triangular prism 102. The collimated beam is transmitted by a polarization beam splitter 103, is converted into circularly polarized light by a quarter-wave plate 104, and is focused onto a multi-layered disk 501 by an objective lens 404. The readout target layer is 511, and the position of the minimum spot of the laser light is on 511. 512 is another recording layer relative to the target layer 511. The reflected light from the multi-layered disk, including stray light, returns to the objective lens 404, and is converted by the quarter-wave plate 104 into linearly polarized light that is polarized in a direction that is orthogonal to the original polarization direction. As a result, it is reflected by the polarization beam splitter 103, and travels towards a detection lens system 406. If the astigmatic method is used, the detection lens system 406 would include a cylindrical lens in addition to a condenser lens, and astigmatism is introduced into the detection lens system. The light that has traveled through the detection lens system 406 is detected by a detector 52. As for the form of the detector, if the astigmatic method is used, a four-segment detector is used. Focus error signals for controlling the focal position of the objective lens and tracking error signals for tracking data tracks in the circumferential direction of the rotating optical disk are generated at an electric circuit 53. The objective lens 404 is controlled through an actuator.

With reference to FIG. 3, crosstalk by a multi-layered optical disk occurring in a detection optical system of an optical pickup is explained. Here, for purposes of simplicity, 501 is an optical disk with two layers, and 511 and 512 are information recording layers. As indicated, with a laser beam 80, the minimum beam spot position of laser light from an objective lens 401 is on the recording layer 511, and information from the recording layer 511 is being read. The reflected light from the recording layer 511 is that which is sought, and returns to the objective lens 401 following the same optical path as the incident light. After traveling through a detection lens 402, it becomes a light beam 81 and strikes a detector 51. Electric signals from the detector are processed at a signal processing circuit 63, and are used to control the irradiation position of the laser light or as data signals.

Multi-layered disks are designed such that the amount of reflected light from each layer when laser light is focused thereon would be substantially the same. For this reason, transmissivity is greater the closer the layer is to the objective lens, thus making it possible to irradiate with laser light layers that are further away from the objective lens. Under such conditions, when laser light is focused on 511, which is the target layer for information readout, a portion of the laser light is transmitted by the target layer 511 as a light beam 82, and is reflected by the adjacent layer 512. This is a reflected light beam 83, which returns to the objective lens 401, enters the detection lens 402, after which it first converges just before the photodetector 51, and strikes the detector 51 while diverging as indicated with a light beam 84. The light beam 84 overlaps with the light beam 81 on the detector 51. As a result, an intensity distribution that is different from when only the light beam 81 is incident occurs due to interference effects. This intensity distribution varies with the tilt of the optical disk, interlayer spacing, and the like. Therefore, the balance of the tracking error signals and the like, of which differences are calculated, is disrupted, causing a problem of running off the track. When the adjacent layer 512 is closer to the objective lens than the readout target layer 511, too, reflected light from the adjacent layer occurs, and interference similarly becomes a problem.

In order to solve the problem with interference described above, the optical pickup optical system shown in FIG. 4 has been invented. In this optical system, there is added an optical system that eliminates stray light from other layers with a segmented wave plate. Laser light that is emitted from the semiconductor laser 101 is converted into a circular collimated light beam by the collimator lens 403 and the triangular prism 102. The collimated beam is transmitted by the polarization beam splitter 103, is converted into circularly polarized light by the quarter-wave plate 104, and is focused on the multi-layered disk 501 (here, a two-layered disk is shown in the diagram) by the objective lens 404. The readout target layer is 511, and the position of the minimum spot of the laser light is on 511. The reflected light 83 occurs from the adjacent layer 512 as well, and becomes stray light that causes crosstalk. The reflected light from the multi-layered disk, including stray light, returns to the objective lens 404, and is converted by the quarter-wave plate 104 into linearly polarized light that is polarized in a direction that is orthogonal to the original polarization direction. As a result, the reflected light 83 that has passed through the quarter-wave plate 104 is reflected at the polarization beam splitter 103, and travels towards a condenser lens 405.

70 is a segmented wave plate whose optic axis direction is set in a predetermined direction. 43 is a reflecting mirror. The polarization direction of the reflected light from the readout target layer emerging from the segmented wave plate 70 is converted in an orthogonal direction by the segmented wave plate 70. However, the polarization direction of the reflected light from the adjacent layer is unchanged. Of the reflected light that returns to the condenser lens 405, that which is from the adjacent layer is unchanged in its polarization direction, and is therefore reflected at the polarization beam splitter 103. On the other hand, the polarization direction of the reflected light from the readout target layer is rotated by 90°, and is therefore transmitted by the polarization beam splitter 103. Thus, only the reflected light from the readout target layer travels through the detection lens 406. Light that has traveled through the detection lens 406 is detected by the detector 52. As for the form of the detector, if the astigmatic method is used, a four-segment detector is used. Focus error signals for controlling the focal position of the objective lens and tracking error signals for tracking data tracks in the circumferential direction of the rotating optical disk are generated at the electric circuit 53, and an actuator for controlling the position of the objective lens 404 is driven.

The optical system of FIG. 2 is an optical pickup without crosstalk countermeasures. The optical system of FIG. 4 has a crosstalk countermeasure. As is evident from a comparison of the two diagrams, in FIG. 4, an optical path is added below the polarization beam splitter, and the condenser lens 405, the segmented wave plate 70, and the reflecting mirror 43 are added. As a result, the optical pickup becomes larger by an amount corresponding to the crosstalk countermeasure optical system.

In the present invention, the problems described above are solved by providing a crosstalk eliminating means, which uses segmented wave plates at the posterior focal line position of an astigmatism introducing lens system, in an optical pickup apparatus that is equipped with a detection optical system that performs focus detection using the astigmatic method.

In the present invention, a first segmented wave plate, a second segmented wave plate, and an analyzer are provided between a detector and an astigmatic lens immediately. Therefore, there is no need to alter the optical path, thereby preventing the optical pickup from becoming larger. As a result, it is possible to realize an optical pickup apparatus whose size can be reduced with ease. In addition, according to the present invention, crosstalk during read-write operations of multi-layered disks is also reduced.

In addition, according to another aspect of the present invention, the polarization direction of the reflected light from the target layer and the polarization direction of the reflected light from other layers can be made orthogonal to each other. Thus, it is possible to eliminate reflected light from other layers. As a result, reflected light from other layers does not enter into the data signals either. Therefore, it is possible to obtain data signals with little error. In addition, since stray light does not contaminate the tracking error signals and focus signals, accurate laser light irradiation position control becomes possible. As a result, the laser irradiation position during reading or writing can be determined accurately,

DESCRIPTION OF REFERENCE NUMERALS

Figure 1:
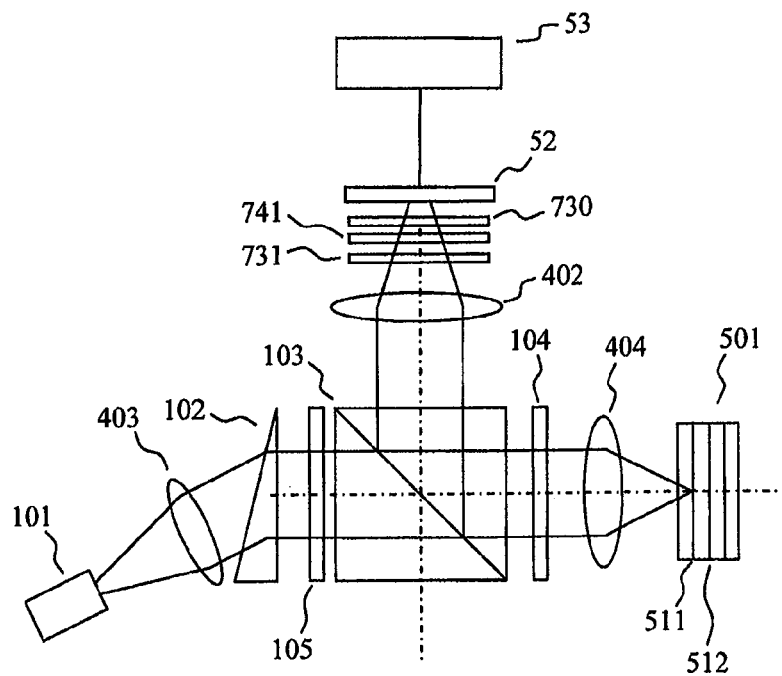
FIG. 1 is a diagram showing an optical pickup according to the present invention.

52 .... Detector
53 .... Signal processing circuit
101 .... Semiconductor laser
103 .... Polarization beam splitter
104 .... Quarter-wave plate
105 .... Diffraction grating
402 .... Astigmatic lens system
404 .... Objective lens
501 .... Multi-layered disk
730 .... Analyzer
731 .... First composite segmented wave plate
741 .... Second composite segmented wave plate

DETAILED DESCRIPTION OF THE PREFERRED EMBODIMENTS

Principles and configurations of optical pickup apparatuses and optical disk drive apparatuses to which the present invention is applied are explained below with reference to the drawings.

Figure 5:
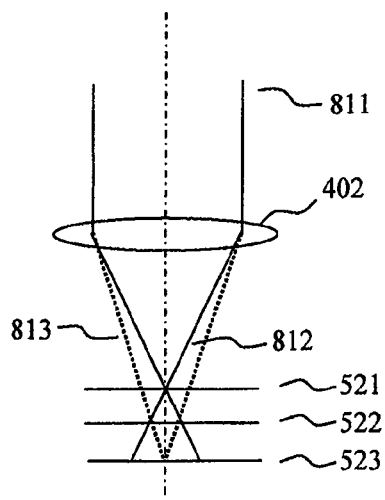
FIG. 5 is a diagram illustrating states of a light beam in an astigmatic optical system.

FIG. 5 illustrates states of a light beam in an astigmatic optical system. 402 is a lens system to which astigmatism is introduced, and may comprise a single lens or a plurality of lenses. When light passes through a lens system to which astigmatism is introduced, the shape of the light spot formed by the transmitted light is distorted from a circle into an elliptical shape, and becomes a focal line. As it travels further, it becomes circular, and then becomes a focal line again. In the present embodiment, of the focal lines formed by astigmatism, the direction of the focal line that is closer to the astigmatism introducing lens system will be referred to as the "direction of astigmatism" for purposes of convenience.

In FIG. 5, it is assumed that the direction of astigmatism is perpendicular to the plane of the paper. Since the direction of astigmatism is in the depth direction of the plane of the paper, the cross-section of the light beam, which has passed through the astigmatic lens system 402, is an elliptical shape whose major axis is perpendicular to the plane of the paper. 812 illustrates the state of the beam as viewed from the front of the plane of the paper. 813 illustrates the state of the beam as viewed from a side of the plane of the paper. The posterior focal line of the beam is formed in a plane 521, the circle of least confusion in a plane 522, and the anterior focal line in a plane 523. Here, the anterior focal line refers to the focal line that is further away from the lens system, while the posterior focal line refers to the focal line that is closer to the lens system. The posterior focal line is perpendicular to the plane of the paper, and becomes narrower in the plane 521. The anterior focal line is parallel to the plane of the paper in the plane 523. In order to realize the astigmatic method, a segmented detector would be provided at the position of the circle of least confusion, in other words the position of the plane 522, to detect the reflected light from an optical disk.

Figure 6:
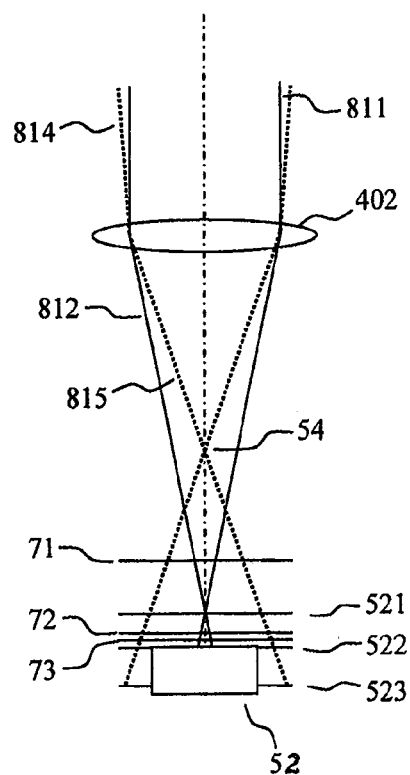
FIG. 6 is a diagram illustrating actions of the present invention.

In FIG. 6, the sensing surface of the detector 52 is disposed at the position 522 of the circle of least confusion of the astigmatic optical system. The position of 521 is where the posterior focal line of the reflected light from the target layer is. The direction of the focal line is perpendicular to the plane of the paper. Here, a plane that is perpendicular to the plane of the paper and that contains the posterior focal line and the optical axis is considered. Light that is incident on the astigmatic lens system 402 at the half that is to the left of this perpendicular plane travels on the side of the plane of the paper to the right of this perpendicular plane after passing through the posterior focal line. Similarly, light that passes through the right half of the astigmatic lens system 402 travels on the side of the plane of the paper to the left of this perpendicular plane after passing through the posterior focal line. A light beam 814 indicates reflected light from an adjacent layer that is at a deeper position than the target layer. After passing through the astigmatic lens system 402, it forms a posterior focal line 54 at a position located towards the astigmatic lens system 402 as indicated by 815. Here, "deeper position" means being further away, relative to a given layer of a multi-layered disk, in the opposite direction to the optical system of an optical pickup that is disposed so as to face the multi-layered disk. In FIG. 6, a case is simulated where the posterior focal line of the reflected light from an adjacent layer, which is, as viewed from the optical system of the optical pickup, further, in other words at a deeper position, than the target layer and closest to the target layer, is formed at 54. In a multi-layered disk, not all interlayer spacings are necessarily the same. Therefore, in the design of an optical system of an optical pickup apparatus, attention is focused on, of a plurality of recording layers forming a multi-layered disk, a recording layer whose spacing with an adjacent layer is narrowest. In accordance with the distance between this recording layer and the adjacent layer, such conditions as the power of the astigmatic lens system 402, the spacing between the detector and the astigmatic lens system 402, and the like are set. As a result, posterior focal lines from other adjacent layers will not come closer to the posterior focal line at 521 than the position of 54.

Here, a first segmented wave plate 71 is provided between the posterior focal line 54 and the plane 521 that contains the posterior focal line of the reflected light from the target layer. A second segmented wave plate 72 is provided between the plane 521 and the plane 522. Further, an analyzer 73 is provided between the second segmented wave plate 72 and the plane 522. The segmentation lines of the segmented wave plates are made to be in the same direction as the posterior focal lines. Reflected light from layers other than the target layer is blocked by the combination of the first segmented wave plate, the second segmented wave plate, and the analyzer 73. Thus, it becomes possible to have only the reflected light from the target layer reach the detector 52. Here, a segmented wave plate refers to an optical element in which two wave plates with distinct optical properties are in contact via a straight line, where both exhibit distinct optical actions on polarized light.

Figure 7:
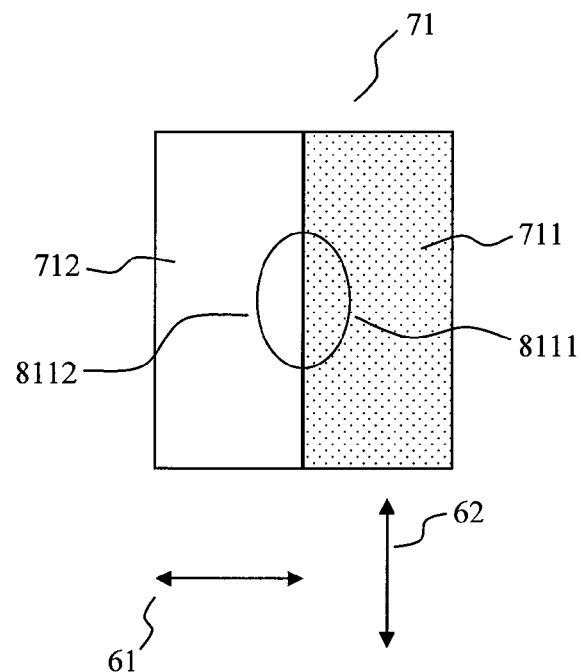
FIG. 7 is a diagram showing a first segmented wave plate and the polarization directions of reflected light from the target layer after traveling therethrough.

The actions of the segmented wave plates in the optical system shown in FIG. 6 are explained below with an example in which half-wave plates are used in the segmented wave plates. It is assumed that the polarization direction of the reflected light that is incident on the lens system 402 is in the horizontal direction (transverse direction) in FIG. 6. After traveling through the lens system 402, reflected light 811 from the target layer irradiates the first segmented wave plate shown in FIG. 7. The first segmented wave plate 71 comprises a half-wave plate 711 and a non-polarization region 712 that does not alter the polarization state, and the segmentation direction substantially aligns with the direction of the posterior focal line. Since astigmatism is introduced into the lens system 402, the beam spot shape on the first segmented wave plate is elliptical. Here, the optical axis of the optical system is adjusted such that the beam spot travels through both of the regions 711 and 712 so as to straddle the segmentation line (the border line between the regions 711 and 712) of the first segmented wave plate. The same also applies to the second segmented wave plate described below.

Figure 8:
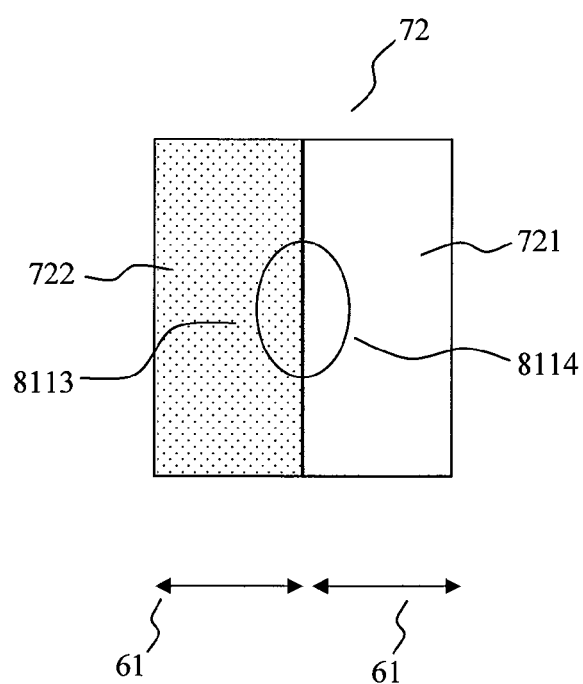
FIG. 8 is a diagram showing a second segmented wave plate and the polarization directions of reflected light from the target layer after traveling therethrough.

The light that irradiates the left side of the lens system 402 irradiates the non-polarization region 712 of the first segmented wave plate 71 in a semi-elliptical shape 8112. However, the polarization direction after traveling therethrough does not change. An arrow 61 indicated in FIG. 7 below the non-polarization region represents the polarization direction. The polarization direction of the arrow 61 represents a direction equivalent to the polarization direction of the light incident on the lens system 402. The light that irradiates the right side of the lens system 402 irradiates the half-wave plate 711 with a beam shape of a semi-elliptical shape 8111. The optical axis of the half-wave plate is so set as to change polarization in the horizontal direction of 61 to the vertical direction in the plane of the paper of FIG. 7. Thus, the polarization direction of the light of the beam shape of the semi-elliptical shape 8111 is converted to the direction indicated by the arrow 62 after traveling through the half-wave plate 711. After passing through the posterior focal line, the reflected light from the target layer that has traveled through the first segmented wave plate irradiates the second segmented wave plate 72 in FIG. 8. Since the semi-elliptical beam 8111 in FIG. 7 passes through the focal line, it becomes a beam of a semi-elliptical shape 8113 on the second segmented wave plate 72, and appears on the left side with the polarization direction 61. On the other hand, the semi-elliptical beam in FIG. 7 denoted by 8112 appears on the right side on the second segmented wave plate in FIG. 8, and becomes a beam of a semi-elliptical shape 8114. 721 is a non-polarization region. Therefore, after the beam denoted by 8114 travels through the region 721, the polarization direction is the polarization direction represented by 61, and does not change. In summary, the polarization direction of the reflected light from the target layer does not change after traveling through the first and the second segmented wave plates.

Next, the polarization direction of reflected light from an adjacent layer will be discussed. 814 in FIG. 6 denotes reflected light from an adjacent layer that is deeper than the target layer and whose interlayer spacing is narrowest. It forms a posterior focal line at the position of 54 that is closer to the lens system 402 than the posterior focal line of the reflected light from the target layer. Reflected light from a deeper layer would form a posterior focal line at a position that is closer to the lens system 402 than that of 54, and the focal line would never come closer to the first segmented wave plate 71. In addition, the position of the posterior focal line of reflected light from a shallower layer than the target layer is at a position beyond the position 522 of the circle of least confusion of the reflected light from the target layer. Thus, the posterior focal line position of the reflected light from a layer other than the target layer does not fall between the first segmented wave plate 71 and the second segmented wave plate 72. As a result, between the first segmented wave plate and the second segmented wave plate, no light beam crosses the plane containing the optical axis and the posterior focal line. In other words, the beam that is incident on each of the left and right regions of the first segmented wave plate would similarly be incident on each of the left and right regions of the second segmented wave plate. Explanation is given using the reflected light from the adjacent layer that is deeper than the target layer and whose interlayer spacing is narrowest. However, reflected light from other layers is also subjected to similar actions from the first segmented wave plate 71 and the second segmented wave plate 72. 71 in FIG. 9 and 72 in FIG. 10 denote the first segmented wave plate and the second segmented wave plate, respectively. They are the same as those shown in FIG. 7 and FIG. 8, respectively. The right region of the first segmented wave plate 71 is the half-wave plate 711, and the polarization direction of the light in a semi-elliptical region 8141 is rotated to the polarization direction of 62. The light in this portion becomes an irradiation region of a semi-elliptical shape 8144 at the second segmented wave plate in FIG. 10. However, since this region 721 is a non-polarization region, the polarization direction does not change. Therefore, the polarization direction after traveling through the second segmented wave plate is the vertical direction denoted by 62. On the other hand, the polarization direction of a beam 8142 that is incident on the left side of the first segmented wave plate 71 in FIG. 9 maintains the polarization state 61 in the horizontal direction as 712 is a non-polarization region. This beam enters a half-wave plate 722 of the second segmented wave plate 72 in FIG. 10 in the state of a semi-elliptical shape 8143, and its polarization direction changes to the vertical direction denoted by 62. In summary, the polarization direction of the reflected light from layers other than the target layer is rotated by 90° to become vertical after traveling through the first and the second segmented wave plates.

The analyzer 73 is provided behind the second segmented wave plate 72. The role of this analyzer is to transmit to the detector 52 only the reflected light from the target layer. The polarization direction of the reflected light from the target layer is in the horizontal direction, and the polarization direction of the reflected light from layers other than the target layer is in the vertical direction. Thus, by setting the analyzer such that it transmits horizontally polarized light, it becomes possible to detect by the detector only the reflected light from the target layer, and the influences of reflected light from other layers can be reduced.

Figure 9:
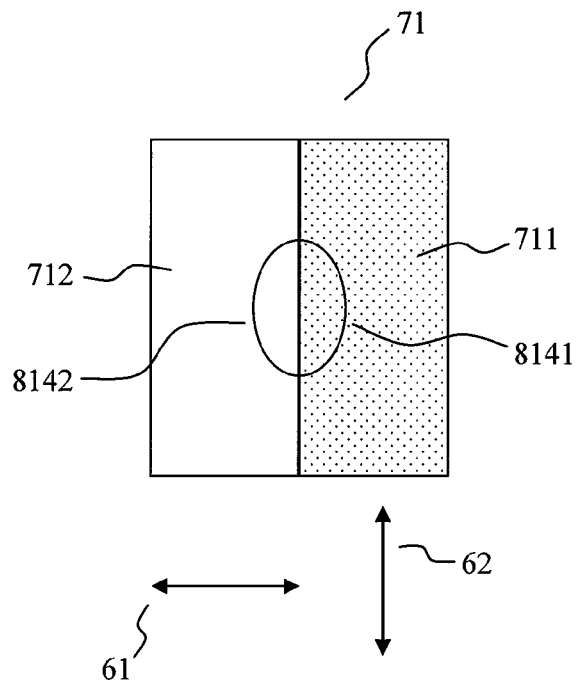
FIG. 9 is a diagram showing the first segmented wave plate and the polarization directions of reflected light from another layer after traveling therethrough.
Figure 10:
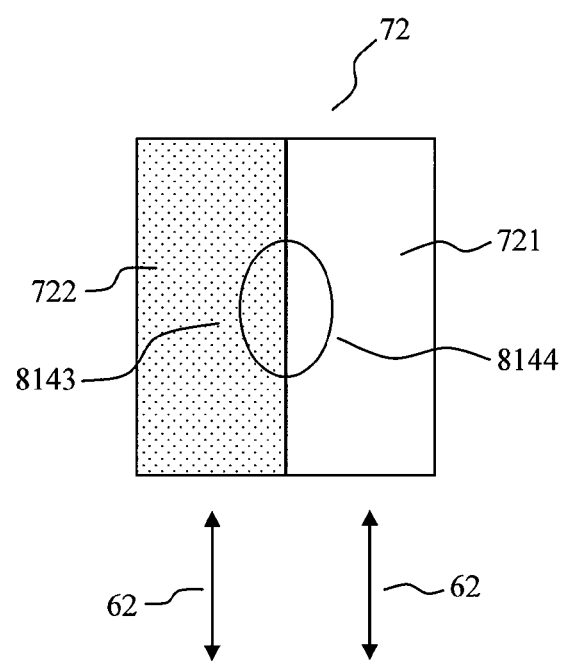
FIG. 10 is a diagram showing the second segmented wave plate and the polarization directions of reflected light from another layer after traveling therethrough.
Figure 11:
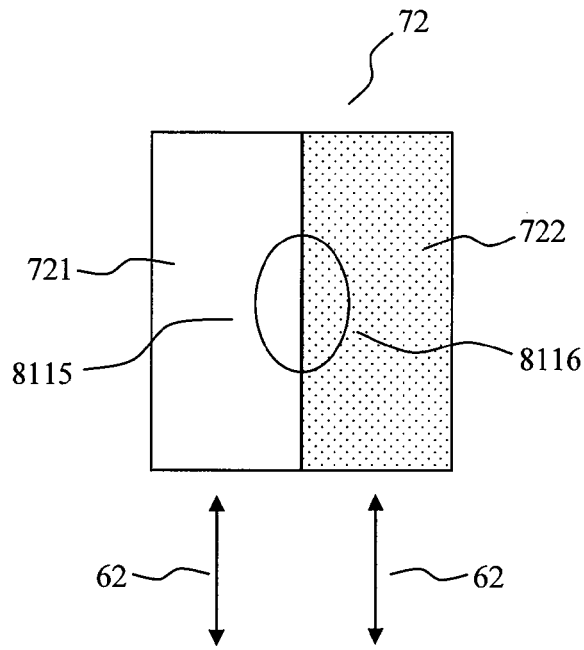
FIG. 11 is a diagram showing the second segmented wave plate as inverted and the polarization directions of reflected light from the target layer.
Figure 12:
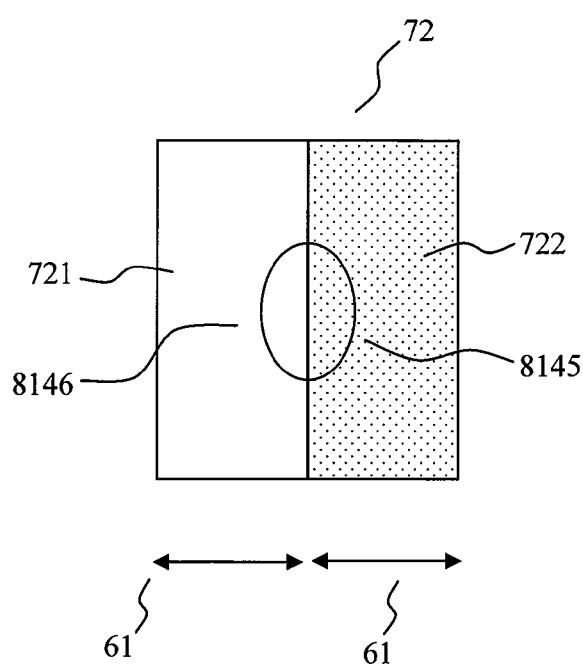
FIG. 12 is a diagram showing the second segmented wave plate as inverted and the polarization directions of reflected light from another layer.

If the left and the right of the second segmented wave plate are inverted, the polarization direction of the reflected light from the target layer would be in the vertical direction, and the polarization direction of the reflected light from other layers would be in the horizontal direction. Thus, by setting the analyzer such that vertically polarized light can pass therethrough, it is possible to lead to the photodetector only the reflected light from the target layer. The polarization directions of the reflected light from the target layer after traveling through the first segmented wave plate 71 are already represented in FIG. 7. These polarization directions are incident on the second segmented wave plate 72 in FIG. 11. The beam denoted by 8111 in FIG. 7 becomes a beam 8115 in FIG. 11, and its polarization direction does not change from the vertical direction state. In addition, the beam denoted by 8112 in FIG. 7 becomes a beam 8116 in FIG. 11, and its polarization direction changes to the vertical direction. Thus, the polarization direction of the reflected light from the target layer becomes vertical. With respect to the reflected light from layers other than the target layer, the polarization directions of the light emerging from the first segmented wave plate are as shown in FIG. 9, and light of these polarization directions is incident on the second segmented wave plate shown in FIG. 12. The beam 8142 in FIG. 9 becomes a beam 8146 in FIG. 12. The beam 8141 in FIG. 9 becomes a beam 8145 in FIG. 12. The polarization direction of the beam 8146 is unchanged in the horizontal direction. The polarization direction of the beam 8145 rotates by 90° and becomes horizontal. Thus, as a whole, the polarization direction of reflected light from layers other than the target layer becomes horizontal. As a result, if an analyzer that transmits vertically polarized light is used as the analyzer 73 in the diagram, it becomes possible to detect by the detector only the reflected light from the target layer.

Possible combinations of the first segmented wave plate, the second segmented wave plate, and the analyzer are indicated in Table 1. In addition, polarization directions of the reflected light from other layers and the target layer after traveling through the second segmented wave plate are indicated. 1) and 2) are methods that use half-wave plates, and their actions have already been explained. 3) and 4) are methods that use quarter-wave plates, and the polarization directions of the reflected light from the target layer and the reflected light from other layers can be made to differ by the difference in the regions passed by the two. It is assumed that light linearly polarized in the horizontal direction and traveling through a +quarter-wave plate and a −quarter-wave plate is converted into right-handed circularly polarized light and left-handed circularly polarized light, respectively. In 3), the reflected light from the target layer becomes right-handed circularly polarized light after traveling through a +quarter-wave plate on the right side of the first segmented wave plate. It then passes through a −quarter-wave plate on the left side of the second segmented wave plate. Thus, the polarization state reverts to linear polarization in the horizontal direction. The polarization state of light that passes through the left side of the first segmented wave plate becomes left-handed circular polarization. It then passes through a +quarter-wave plate on the right side of the second segmented wave plate, and reverts to the original linear polarization in the horizontal direction. In summary, after passing through the second segmented wave plate, the polarization state of the reflected light from the target layer is linear polarization in the horizontal direction. The reflected light from other layers becomes right-handed circularly polarized light after traveling through the +quarter-wave plate on the right side of the first segmented wave plate. It then passes through the +quarter-wave plate on the right side of the second segmented wave plate, and becomes linearly polarized light in the vertical direction. In addition, the polarization state of light that passes through the left side of the first segmented wave plate becomes left-handed circular polarization. It then passes through the −quarter-wave plate on the left side of the second segmented wave plate, and becomes linearly polarized light in the vertical direction. Therefore, by providing an analyzer that transmits light that is linearly polarized in the horizontal direction, it becomes possible to transmit to the detector only the reflected light from the target layer. In 4), the arrangement of the quarter-wave plates on the left and the right of the first segmented wave plate and the second segmented wave plate is inverted. After traveling through the second segmented wave plate, the polarization state of the reflected light from other layers is linear polarization in the horizontal direction, and the polarization state of the reflected light from the target layer is linear polarization in the vertical direction. The analyzer in this case is so set as to transmit linear polarization in the vertical direction, and only the reflected light from the target layer reaches the detector.

TABLE 1

| | 1st Segmented Wave Plate | 2nd Segmented Wave Plate | Polarization Direction (Other Layer) | Polarization Direction (Target Layer) | Polarization Direction Transmitted By Analyzer |
|---|---|---|---|---|---|
| 1) Right Left | λ/2 plate | λ/2 plate | Vertical | Horizontal | Horizontal |

TABLE 1-continued

|   | | 1st Segmented Wave Plate | 2nd Segmented Wave Plate | Polarization Direction (Other Layer) | Polarization Direction (Target Layer) | Polarization Direction Transmitted By Analyzer |
|---|---|---|---|---|---|---|
| 2) | Right Left | λ/2 plate | λ/2 plate | Horizontal | Vertical | Vertical |
| 3) | Right Left | +λ/4 plate −λ/4 Plate | +λ/4 plate −λ/4 Plate | Vertical | Horizontal | Horizontal |
| 4) | Right Left | +λ/4 plate −λ/4 plate | −λ/4 plate +λ/4 plate | Horizontal | Vertical | Vertical |

The left and right wave plates of the first segmented wave plate have the role of converting linearly polarized light to a mutually orthogonal polarization state. For the second segmented wave plate, one that has the same actions as the first segmented wave plate or one that is inverted may be used. The polarization direction of the reflected light from other layers and the polarization direction of the reflected light from the target layer are mutually orthogonal. Therefore, by aligning the analyzer with the polarization direction of the reflected light from the target layer, it becomes possible to eliminate crosstalk from other layers. In the explanation above, it is assumed that the polarization state of the light incident on the lens system 402 is linear polarization in the horizontal direction. However, if it is in the vertical direction, it would only switch vertical and horizontal in Table 1, and there would be no difference in the crosstalk elimination effect. In addition, in all of 1) to 4), it goes without saying that even if the left and right of the first segmented wave plate and the second segmented wave plate are switched, there is no change in the polarization states of the reflected light from the target layer and the other layers after traveling through the second segmented wave plate, and the effects do not change.

Summarizing the above, by using the first segmented wave plate and the second segmented wave plate, the polarization direction of the reflected light from other layers can be made orthogonal to that of the reflected light from the target layer. Therefore, by blocking the reflected light from the other layers while transmitting the reflected light from the target layer by means of the analyzer, crosstalk from other layers can be reduced.

In the astigmatic method, in order to obtain tracking error signals, the differential push-pull method (DPP method) is often employed. The reason for this is that in order to perform tracking, the objective lens needs to be displaced in the radial direction of the optical disk. Here, with the push-pull method, when displacement is large, the DC component of the signal becomes greater, and there is a problem in that accurate tracking becomes difficult. The differential push-pull method has the advantage of being able to cancel out this DC component. In the DPP method, three beams are used. With respect to each of the beams: a first segmented wave plate is provided between the posterior focal line position of the reflected light from the target layer and the posterior focal line position of the reflected light reflected at an adjacent layer that is at a deeper position than the target layer and whose interlayer spacing is narrowest; a second segmented wave plate is provided between the posterior focal line position of the reflected light from the target layer and a detector; and an analyzer is provided between the second segmented wave plate and the detector. Thus, the reflected light from other layers can be eliminated by the analyzer.

Figure 13:
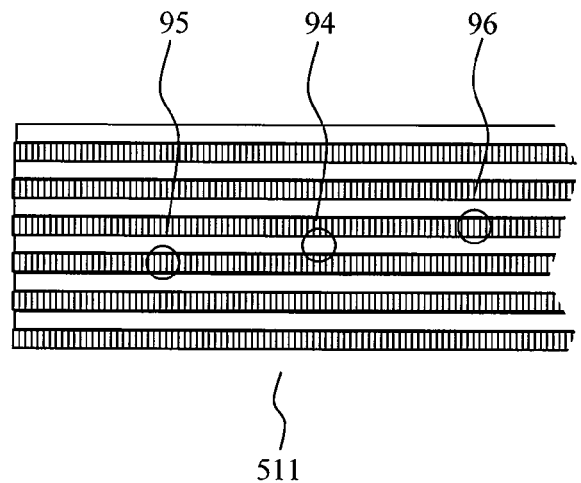
FIG. 13 is a diagram illustrating target layer irradiation states of three beams in the differential push-pull method.
Figure 14:
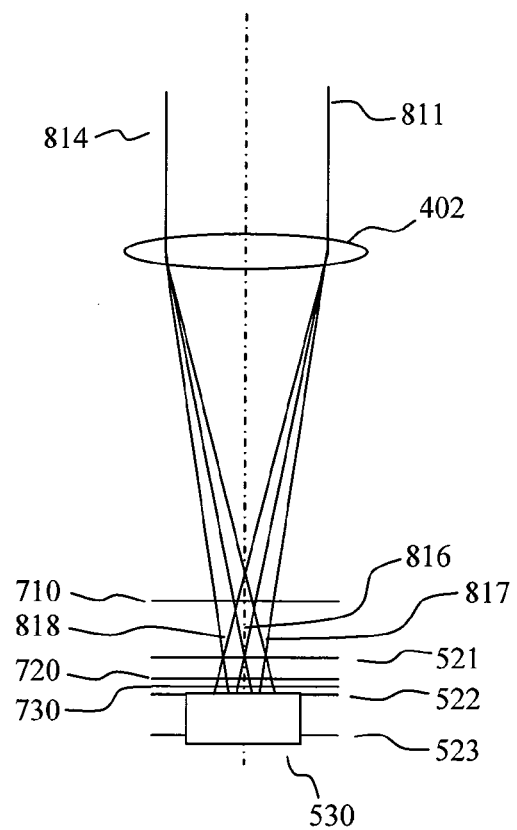
FIG. 14 is a diagram showing a configuration according to the present invention with respect to an astigmatic optical system of the differential push-pull method.

In the DPP method, laser light is split into one main beam and two sub-beams by a diffraction grating, and an optical disk is irradiated. FIG. 13 shows a portion of a disk, and numerous guiding grooves are arranged side by side on the recording layer 511. By way of an objective lens, the three beams irradiate the information recording layer 511, which is the target layer, at their minimum spot size. The light spot by the main beam is 94, and irradiates a groove in which information exists. The spots of the sub-beams are 95 and 96, and irradiate positions that are off by just half the track pitch. The irradiating light is in focus with the recording layer 511 that is the target layer. The reflected light thereof follows the same optical path as the incident light in the opposite direction, and travels towards a detection system. At the detection system, the three beams are focused by the astigmatic lens system 402 as shown in FIG. 14. The main beam is 816, and the sub-beams are 817 and 818. The main beam is on the optical axis of the optical system, but the chief rays of the sub-beams are at a certain angle to the optical axis. The posterior focal line positions of the three beams are in the same plane 521. In addition, the positions of the circles of least confusion of the three beams are also in the same plane 522. The sensing surface of a detector 530 is disposed at the position of these circles of least confusion, and each beam is detected. A first composite segmented wave plate 710 is provided at a position which is closer to the astigmatic lens system 402 than the plane 521 where the posterior focal lines are, and which is on the detector side of the posterior focal line of the reflected light from an adjacent layer that is at a deeper position than the target layer and whose interlayer spacing is smallest. The second composite segmented wave plate 720 is provided between the plane 521, which includes the posterior focal line of the reflected light from the target layer, and the detector 530. It is preferable that the insertion positions of the first and second composite segmented wave plates be such positions at which each of the three beams is separated and becomes an independent beam. In addition, an analyzer 730 is provided between the second composite segmented wave plate 720 and the detector 530.

Figure 15:
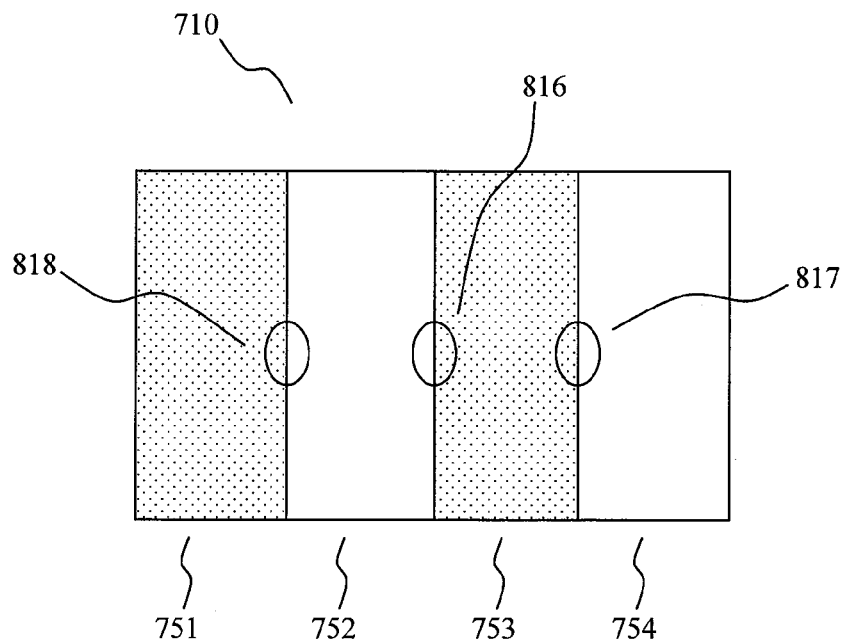
FIG. 15 is a diagram showing an example of a first composite segmented wave plate.
Figure 16:
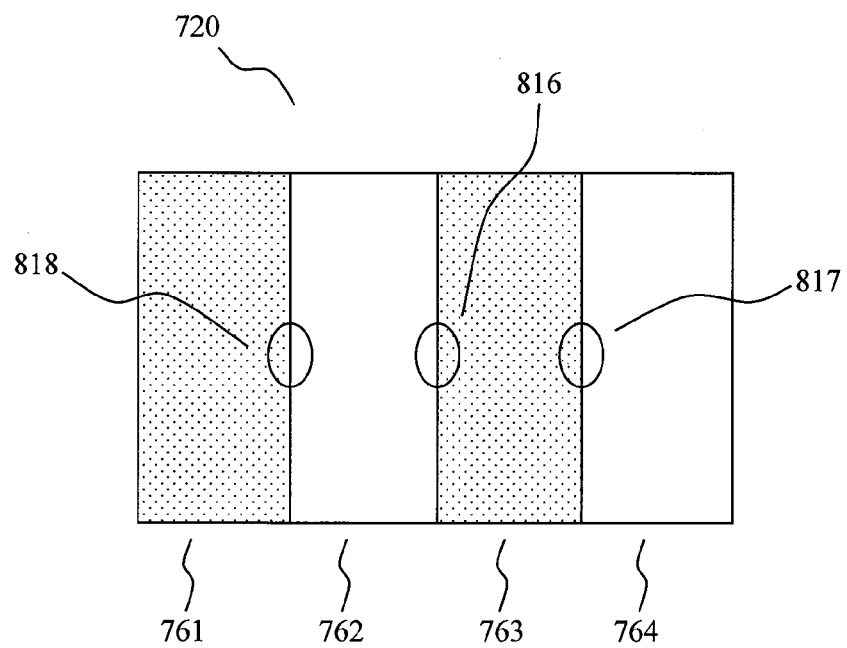
FIG. 16 is a diagram showing an example of a second composite segmented wave plate.

With respect to each of the three beams, reflected light from other layers can be eliminated by using the first segmented wave plate 71 and the second segmented wave plate 72 in FIG. 6. However, since the first segmented wave plates and the second segmented wave plates for the three beams are in the same optical axis plane, a reduction in cost may be expected while adjustment also becomes easier if three segmented wave plates are integrally fabricated. The first composite segmented wave plate 710 that is integrally fabricated is shown in FIG. 15. 816 is the main beam. 817 and 818 are the sub-beams. The center of each beam is aligned with the segmentation position of the wave plates that are segmented in the direction of the posterior focal line. As described above, the wave plates may be half-wave plates or quarter-wave plates. Here, an explanation will be given with regard to half-wave plates. 751 and 753 are half-wave plates. 752 and 754 are non-polarization regions. The second composite segmented wave plate 720 is shown in FIGS. 16. 761 and 763 are half-wave plates. 762 and 764 are non-polarization regions.

This arrangement imparts the actions of 2) in Table 1 with respect to each of the beams. Thus, the polarization direction of the reflected light from the target layer of all beams becomes vertical. By providing the analyzer 730 that transmits vertically polarized light, the reflected light from the target layer is transmitted to the detector. For each reflected light from other layers, the irradiated regions do not switch about its main axis. Thus, the polarization direction after traveling through the second composite segmented wave plate 720 is in the horizontal direction, which is not transmitted by the analyzer 730.

Figure 17:
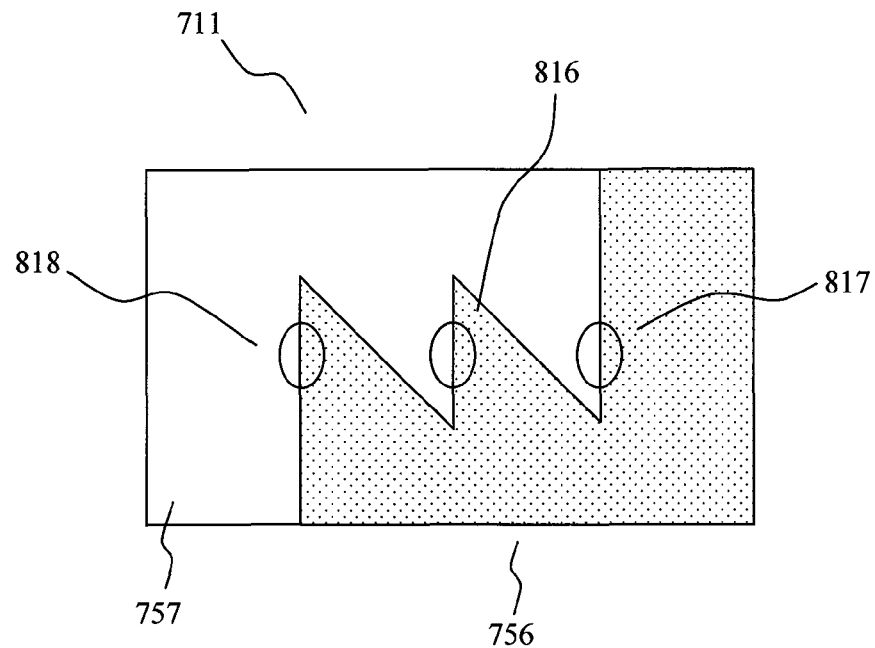
FIG. 17 is a diagram showing an example of the first composite segmented wave plate.
Figure 18:
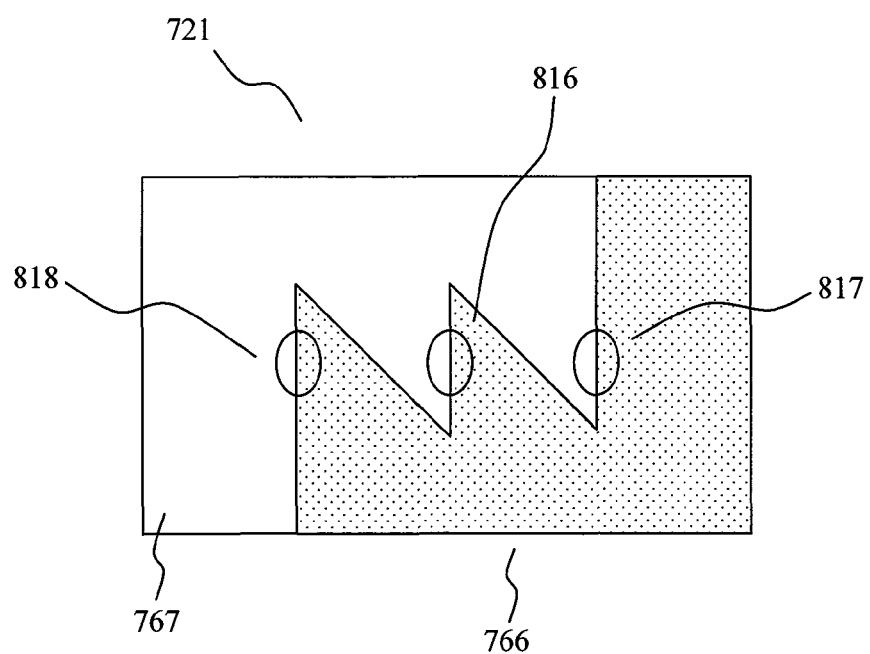
FIG. 18 is a diagram showing an example of the second composite segmented wave plate.

If the directions of the segmentation lines of the first composite segmented wave plate and the second composite segmented wave plate and of the posterior focal lines of the three beams thereof are aligned, and if the positions of the segmentation lines are aligned with the respective chief rays, an effect of eliminating reflected light from other layers will be present. A first composite segmented wave plate 711 as another example is shown in FIG. 17. It is assumed that the region of 756 is, for example, a half-wave plate, and the region of 757 is a non-polarization region. A second composite segmented wave plate 721 that forms a pair therewith is shown in FIG. 18. It is assumed that the region of 766 is a half-wave plate, and the region of 767 is a non-polarization region. Here, after travelling through the second composite segmented wave plate, the reflected light from the target layer becomes vertically linearly polarized light. The polarization direction of the reflected light from other layers is horizontal. Thus, if an analyzer that transmits vertically polarized light is used as the analyzer, it becomes possible to eliminate reflected light from other layers.

Figure 19:
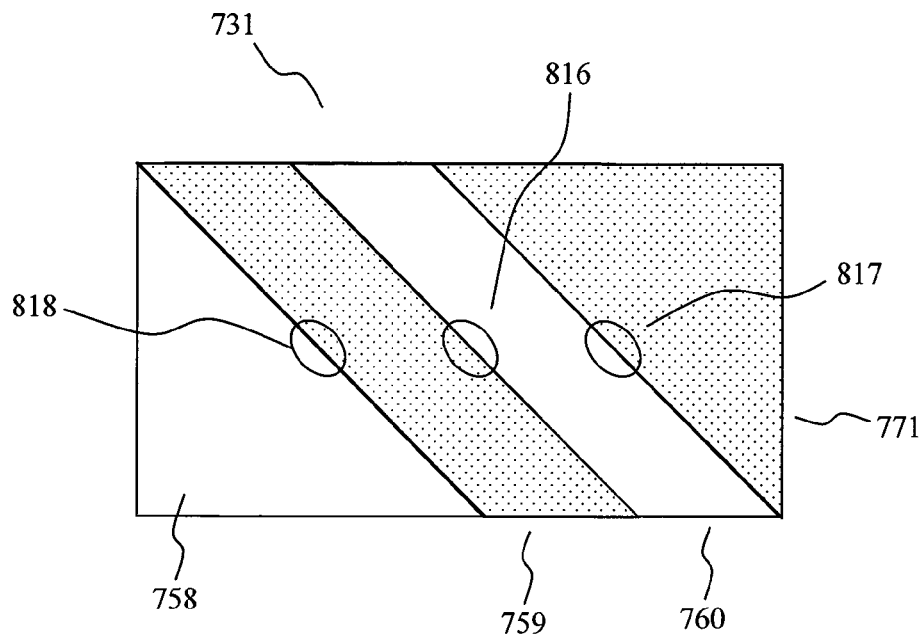
FIG. 19 is a diagram showing an example of the first composite segmented wave plate.
Figure 20:
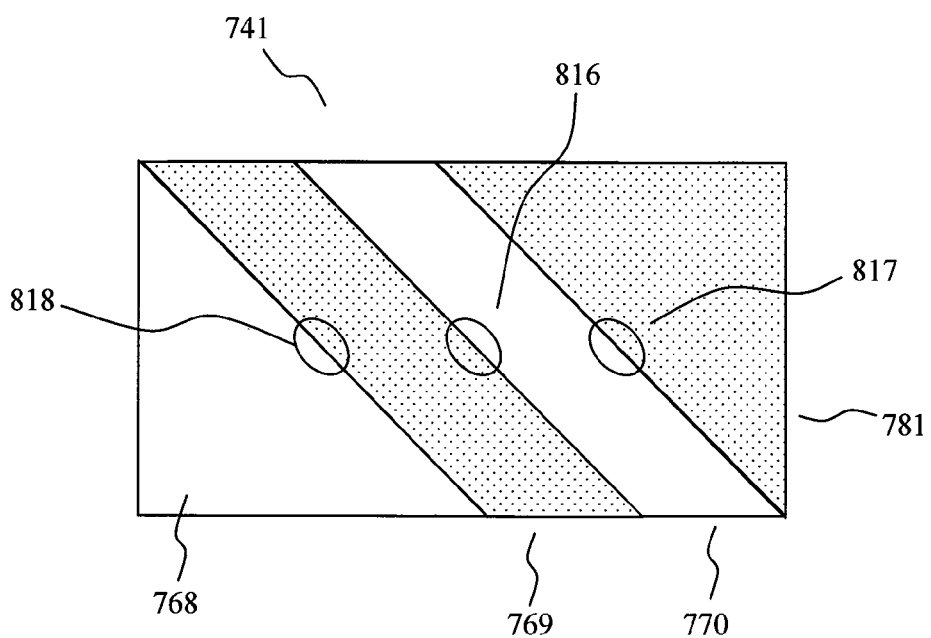
FIG. 20 is a diagram showing an example of the second composite segmented wave plate.

In considering simultaneously obtaining focus error signals as well, the direction of astigmatism of the astigmatic lens system 402 in FIG. 14 is, in some cases, rotated by 45°. In such cases, the direction of the focal lines also rotates by 45°, and it is necessary to rotate the segmentation direction of a first composite segmented wave plate 731 as shown in FIG. 19 and the segmentation direction of a second composite segmented wave plate 741 as shown in FIG. 20 by 45° as well. It is assumed that the regions of 759 and 771 in FIG. 19 and the regions of 769 and 781 in FIG. 20 are half-wave plates. Here, the polarization direction of the reflected light from other layers that has traveled through the second composite segmented wave plate is horizontal, and the polarization direction of the reflected light from the target layer is vertical. Therefore, if an analyzer that transmits vertically polarized light is used, it is possible to block reflected light from other layers.

Figure 21:
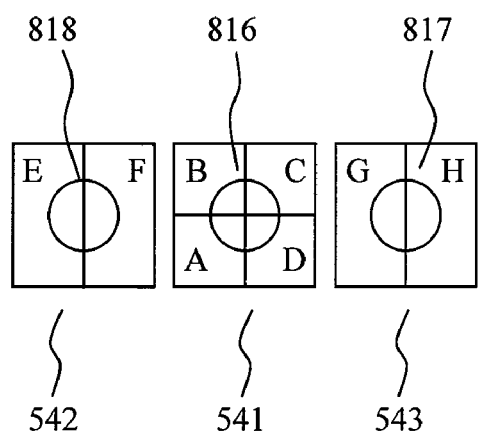
FIG. 21 is a diagram showing forms of sensing portions of detectors when the astigmatic method of the differential push-pull method is used.

The shape of the sensing surface of the detector 530 for detecting the three beams is shown in FIG. 21. A four-segment detector 541 in the middle detects the main beam 816 from the target layer. The reflected light 818 and 817 of the sub-beams from the target layer are detected by two-segment detectors 542 and 543, respectively. Signals from the four-segment detector 541 are denoted A, B, C, and D. Signals from the two-segment detector 542 are denoted E and F. Signals from the two-segment detector 543 are denoted G and H. If the astigmatism of the astigmatic lens system is introduced in a 45° direction, a tracking error signal TR is expressed as TR=(A+B)−(C+D)−k{(E−F)+(G−H)}. Here, k is a constant and is determined by the intensity ratio of the main beam to the sub-beams, and the like. Ordinarily, the intensity of the main beam is set so as to be ten or more times greater as compared to the intensity of the sub-beams. In addition, assuming AF is a focus error signal and RF is a data signal, they may be expressed as follows. AF=A+C−(B+D), RF=A+C+B+D. The TR and AF signals are used to control the irradiation position of the laser light.

As described above, in an optical system that obtains tracking error signals by the differential push-pull method that uses three beams, too, reflected light from other layers can be eliminated by using first and second composite segmented wave plates and an analyzer. Crosstalk with three beams includes interference between the same beams from other layers and interference between different beams. Interference between the same beams refers to, for example, interference between the reflected light of the main beam from the target layer and the reflected light of the main beam from another layer. Interference between different beams refers to interference between the main beam and the sub-beams. The phase difference of these interferences varies with fluctuations in the interlayer spacing of a disk, and intensity fluctuations occur. With the present invention, both types of crosstalk can be eliminated. Interference between main beams results in fluctuations in the RF signals and the AF signals. However, since the reflected light of the main beams from other layers is eliminated, such fluctuations are also eliminated. In addition, interference between the reflected light of the sub-beams from the target layer and the reflected light of the main beams from other layers, when detected at a sub-detector, results in fluctuations in a sub-push-pull signal (E−F)+(G−H). This causes such failures as tracking displacement and the like. In the DPP method, the intensity of the main beam is ten or more times greater than that of the sub-beams. Therefore, the sub-beams from the target layer and the reflected light of the main beam from the adjacent layer turn out to be of comparable intensity, and interference is greater. As a result, the sub-push-pull signals are greatly affected. However, the reflected light of the main beams from other layers can be blocked in the present invention. Thus, the sub-push-pull signals are not affected.

Figure 22:
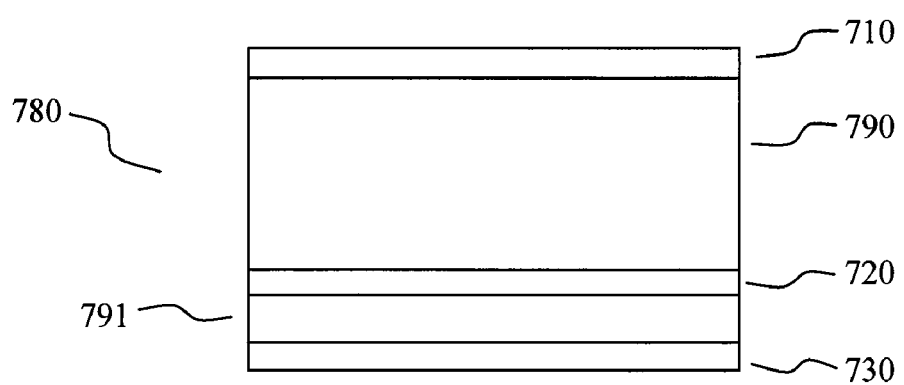
FIG. 22 is a diagram showing a cross section of an optical element in which the first composite segmented wave plate, the second composite segmented wave plate, and an analyzer are integrated.

The first composite segmented wave plate 710, the second composite segmented wave plate 720, and the analyzer 730 shown at 780 in FIG. 22 are individual elements. However, these three optical components may be integrated as shown in FIG. 22. This makes adjustment easier. FIG. 22 is a schematic view of a cross-section of the element along the direction of the optical axis. Reflected light from a disk irradiates from the upper direction. 710 is the first composite segmented wave plate, 720 is the second composite segmented wave plate, and 730 is the analyzer. They are held by glass members 790 and 791 which transmit the laser light used. With respect to the shape of the composite segmented wave plates, those denoted by 731 and 741 may be used, for example. The thickness of the glass members may be determined based on the positions of the posterior focal lines and the detector.

Embodiment 1

Figure 2:
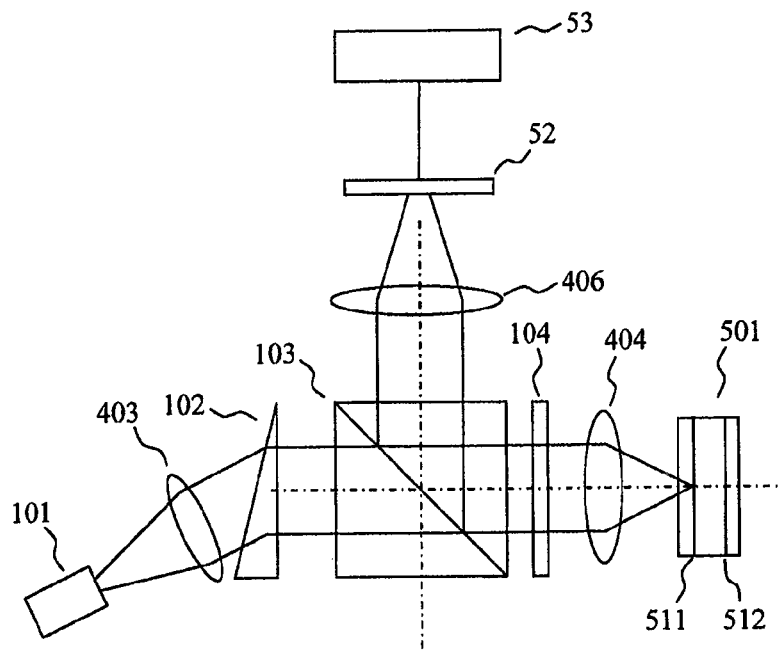
FIG. 2 is a diagram showing the configuration of a conventional basic optical pickup.
Figure 3:
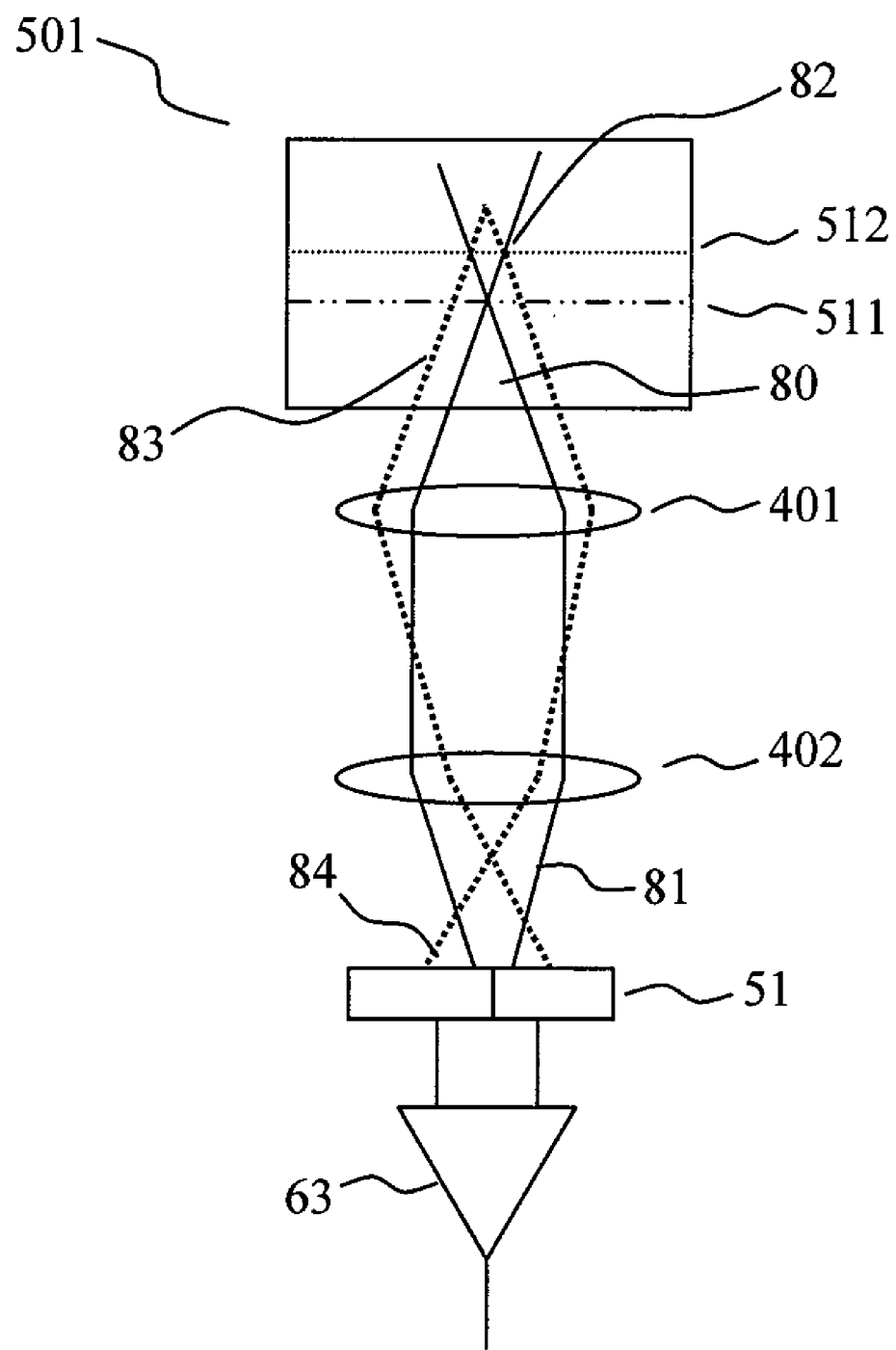
FIG. 3 is a diagram illustrating influences of reflected light from an adjacent layer.
Figure 4:
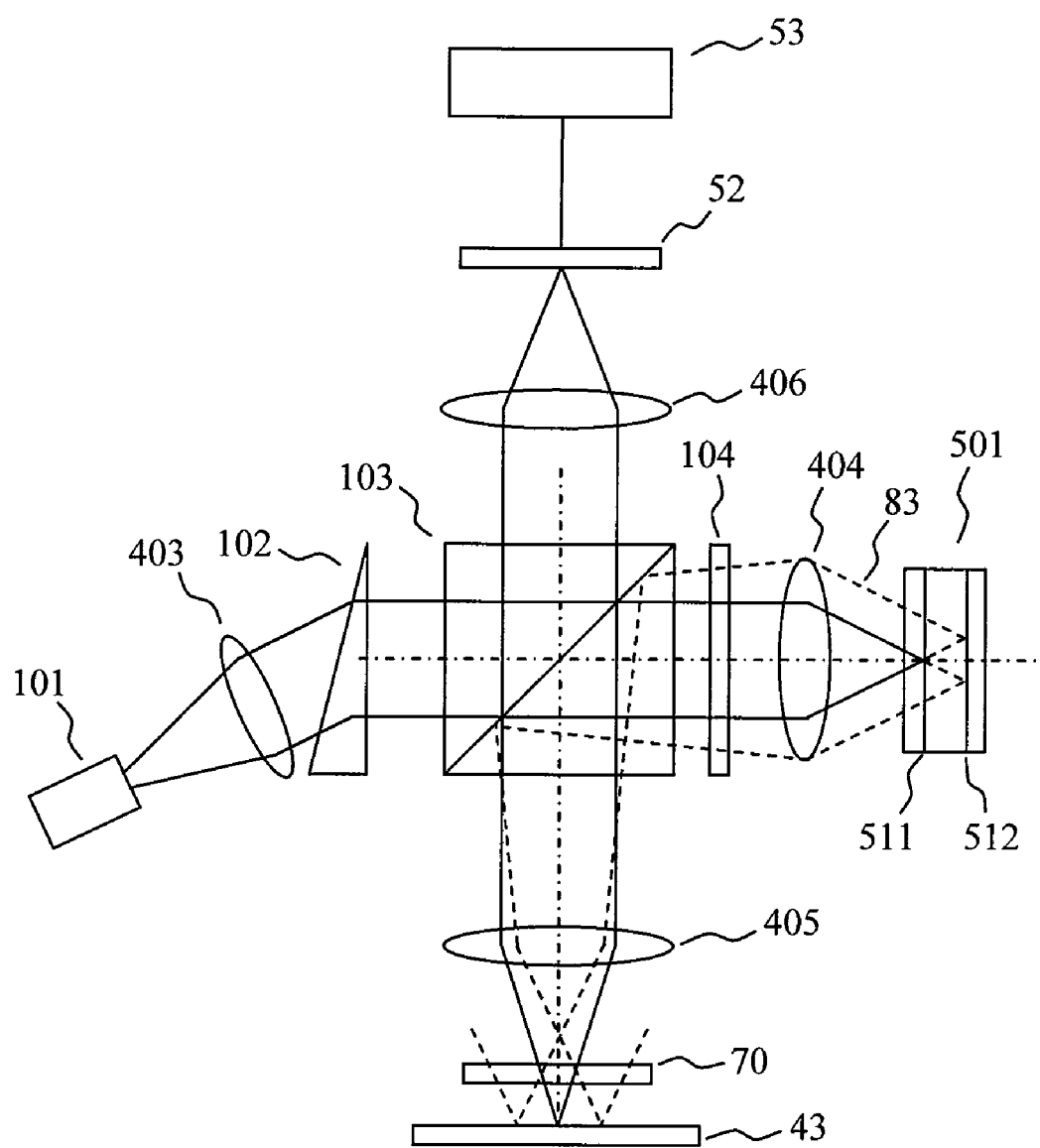
FIG. 4 is a diagram showing the configuration of a conventional optical pickup that uses a segmented wave plate.

The embodiment in FIG. 1 is one in which an optical element for multi-layer crosstalk elimination is added to the basic optical system of the optical pickup apparatus in FIG. 2. Laser light from the semiconductor laser light source 101 is converted into a collimated circular light beam by the collimator lens 403 and the triangular prism 102. The collimated beam is split into one main beam and two sub-beams by a diffraction grating 105. Each beam is transmitted by the polarization beam splitter 103 and the quarter-wave plate 104, and converted into circularly polarized light. The three beams are focused onto the multi-layered disk 501 by the objective lens 404. The target layer in the multi-layered disk is 511. As shown in FIG. 13, the three beams irradiate guiding grooves. The reflected light from the multi-layered disk returns to the objective lens 404. After passing through the quarter-wave plate 104, it is converted into linearly polarized light that is polarized in a direction that is orthogonal to the original polarization direction. The polarization beam splitter 103 reflects light of this polarization direction. Thus, the three beams are reflected and enter the astigmatic lens system 402. Astigmatic lens systems ordinarily comprise a condenser lens and a cylindrical lens. 731 is the first composite segmented wave plate. 741 is the second composite segmented wave plate. For the shape of the wave plates, those shown in FIGS. 19 and 20 may be used. The posterior focal line position of the reflected light from the target layer is between the two composite segmented wave plates. In addition, the first composite segmented wave plate 731 is disposed to the detector 52 side of the posterior focal line position of the reflected light from an adjacent layer that is, as viewed from the objective lens 404, farther than the target layer, in other words is at a deeper position than the target layer, and whose interlayer spacing is narrowest. An analyzer 730 is provided behind the second composite segmented wave plate 741. The shape of the sensing portion of the detector 52 is as shown in FIG. 21. Based on signals from the detector, focus error signals for controlling the focal position of the light emerging from the objective lens and tracking error signals for tracking data tracks in the circumferential direction of the rotating optical disk are generated at the electric circuit 53. They drive an actuator for controlling the position of the objective lens 404.

Figure 23:
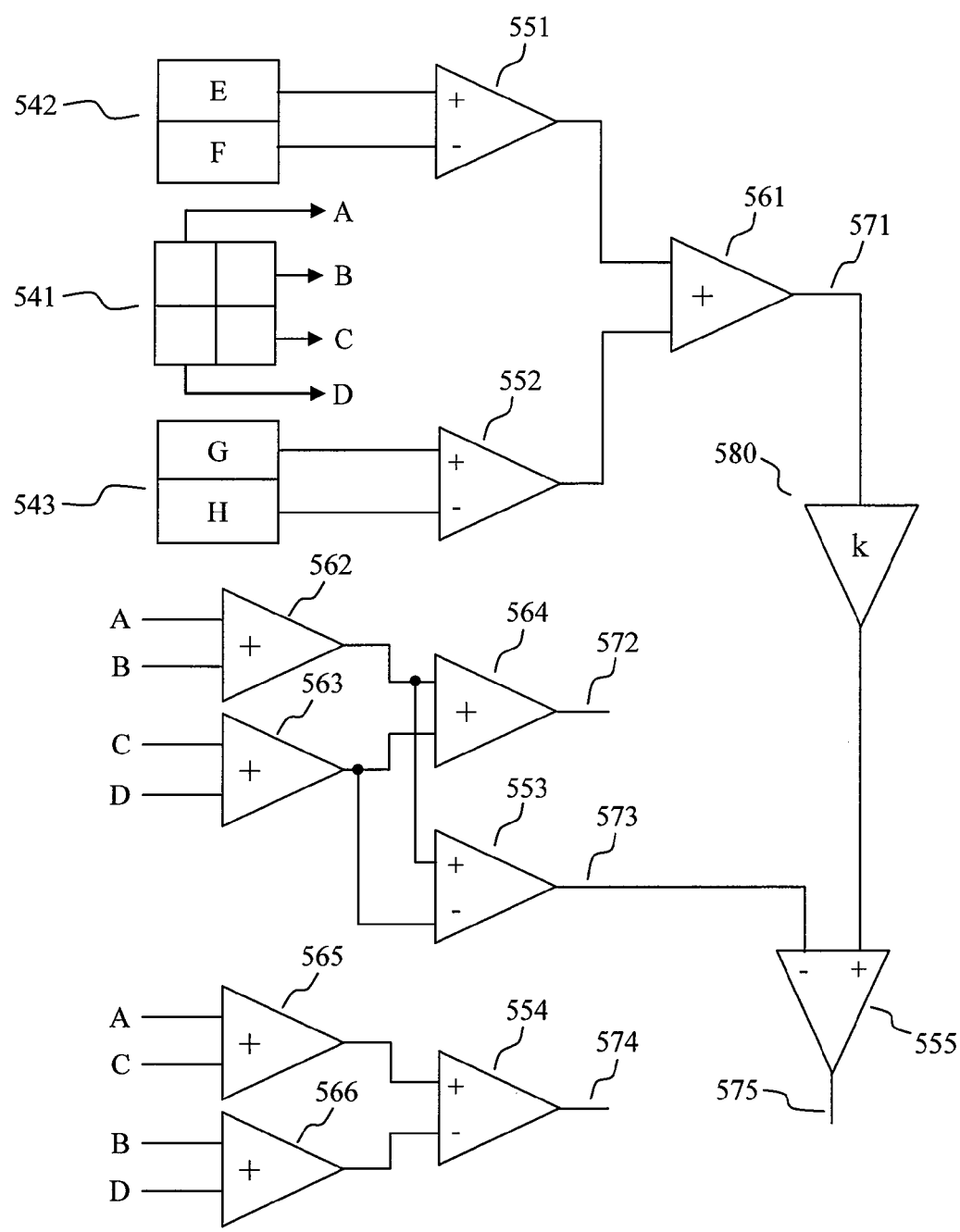
FIG. 23 is a diagram showing an outline of a signal processing circuit.

The electric circuit 53 that processes the output signal of the detector 52 is shown in FIG. 23. The main beam is detected by the region 541. The sub-beams are detected by the two-segment regions 542 and 543. The direction of the segmentation lines of the two-segment regions is perpendicular to the track direction. As the cylindrical lens is rotated by 45°, differential signal E–F of 542 and differential signal G–H of 543 become the push-pull signals of the sub-beams. 551 to 555 are differential amplifiers. 561 to 566 are adder circuits. 580 is an amplifier with an amplification factor of k, where k assumes a value that is determined taking into account the intensity ratio of the main beam to the sub-beams. After the signals from each of the detectors are amplified by preamplifiers, they are processed at these electronic circuits, and become control signals or data signals. 572 is a signal that combines all of the outputs A, B, C, and D from the four-segment detector, and is a data signal. 574 is an AF signal by the astigmatic method. 573 is a push-pull signal by the main beam. 571 is a push-pull signal by the sub-beams. The signal 571 that is amplified by a factor of k is processed at the differential amplifier 555 with the push-pull signal 573 by the main beam, and becomes a TR signal 575.

Embodiment 2

Figure 24:
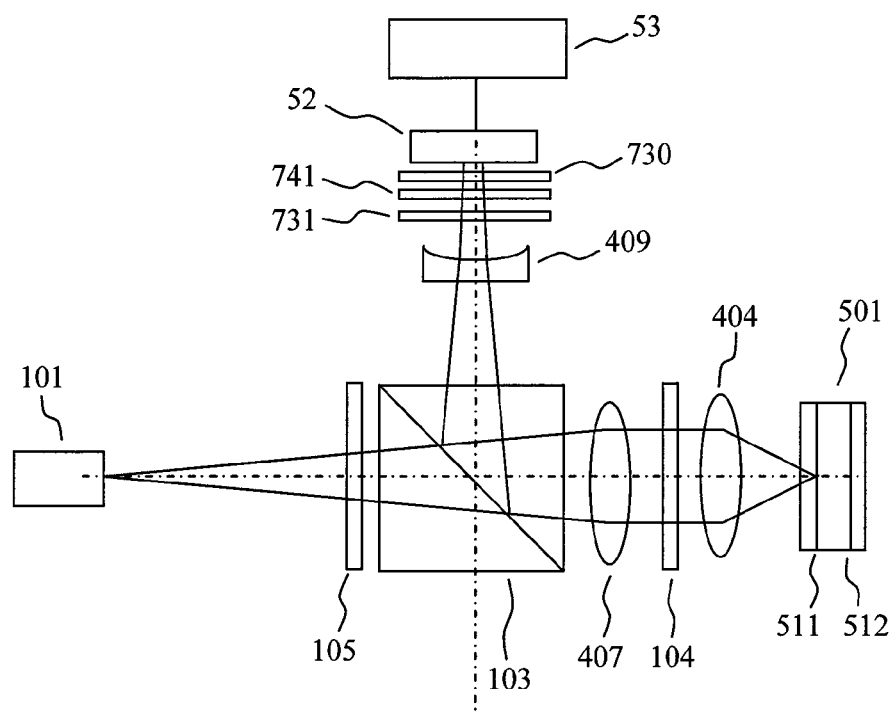
FIG. 24 is a diagram showing another example of an optical pickup according to the present invention.

A configuration example of an optical pickup apparatus of the present embodiment is shown in FIG. 24. In the present embodiment, the diffraction grating 105 and the polarization beam splitter 103 are provided to the semiconductor laser 101 side of a collimator lens 407. As a result, laser light emitted from the semiconductor laser 101 travels through the polarization beam splitter 103 in a state of divergent light. It is then collimated by the collimator lens 407, and enters the quarter-wave plate 104. In the configuration of Embodiment 1, the diffraction grating 105 and the polarization beam splitter 103 were provided between the collimator lens 403 and the objective lens 404. However, in the present embodiment, optical components are disposed in divergent light of the laser light. As a result, an optical system that can be made smaller than the optical system of Embodiment 1 can be realized. Astigmatism is introduced by a cylindrical lens 409. The first composite segmented wave plate 731, the second composite segmented wave plate 741, and the analyzer 730 are provided at a predetermined position on the optical axis, in other words after the astigmatism introducing lens system.

Embodiment 3

Figure 25:
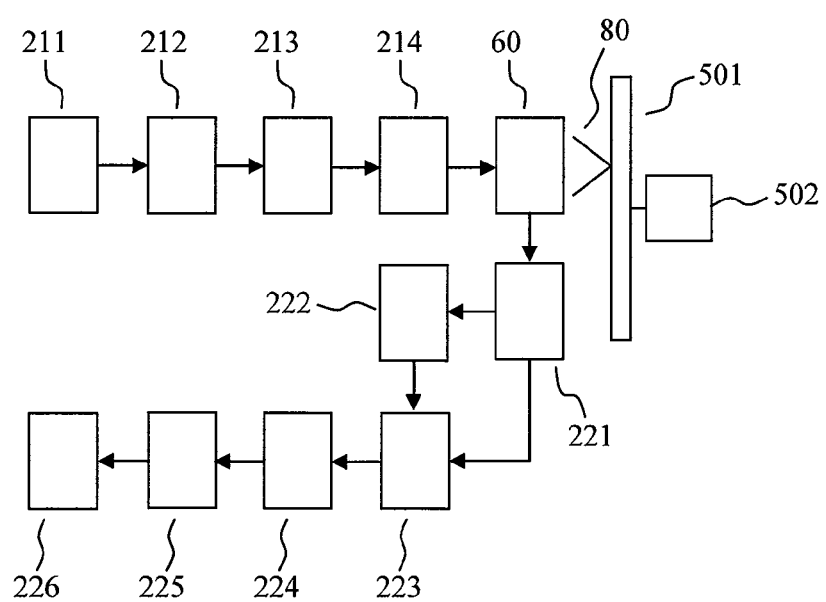
FIG. 25 is a schematic view of an optical disk drive apparatus using an optical pickup according to the present invention.

A configuration example of an optical disk drive apparatus of the present embodiment is shown in FIG. 25. The circuitry from 211 to 214 is for recording data on the multi-layered optical disk 501. 211 is an error correction encoding circuit and adds an error correction code to the data. 212 is a record encoding circuit and modulates the data by the 1-7PP method. 213 is a record compensation circuit and generates write pulses that are suitable for given mark lengths. Based on the generated pulse sequence, a semiconductor laser in an optical pickup 60 is driven by a semiconductor laser drive circuit 214, and laser light 80 that emerges from an objective lens is modulated. A phase-change film is formed on the optical disk 501 that is spun by a motor 502. Heated by laser light, it becomes amorphous when cooled rapidly, and crystalline when cooled gradually. These two states differ in reflectivity, and allow for the formation of marks. In the write state, high-frequency superposition, which lowers the coherence of laser light, is not performed. Thus, the reflected light from the adjacent layer and the reflected light from the target layer are in a state that is susceptible to interference. As a result, if no measures for reducing fluctuations in the tracking signals are taken, such failures as tracking displacement and erasing data in adjacent tracks may occur.

The circuitry from 221 to 226 is for reading data. 221 is an equalizer and improves the signal-to-noise ratio in the vicinity of the shortest mark length. Signals therefrom are input to a PLL circuit 222 and a clock is extracted. In addition, the data signals that are processed at the equalizer are digitized by an A-D converter 223 in synchronization with the extracted clock. 224 is a PRML (Partial Response Maximum Likelihood) signal processing circuit and performs Viterbi decoding. At a record decoding circuit 225, the data is decoded based on modulation rules of the 1-7 PP method. The data is restored at an error correction circuit 226.

INDUSTRIAL APPLICABILITY

According to the present invention, influences of reflected light from other layers that occur when a multi-layered optical disk is read can be reduced without causing an optical pickup apparatus to become larger. As a result, it is possible to keep the size of an optical disk drive apparatus into which an optical pickup apparatus is incorporated small.

In addition, crosstalk by reflected light from other layers that contaminate the data signals can be reduced. Thus, it is possible to improve the data signal quality.

Further, it is possible to reduce tracking signal fluctuations caused in the DPP method. When reading from or writing on a multi-layered optical disk, it is necessary to accurately control the focal position and tracking position of laser light with respect to the optical disk by means of error signals. However, when there is reflected light from an adjacent layer, deviations in the focal position and tracking position occurs due to interference effects. Thus, it becomes impossible to read data signals accurately, or to set write positions accurately. With the present invention, such problems can be obviated.

What is claimed is:

1. An optical pickup apparatus for use on a multi-layered optical information storage medium, comprising:
    a laser light source;
    an irradiation focusing optical system that focuses laser light from the laser light source on a recording layer of the multi-layered optical information storage medium;
    an astigmatic lens system that imparts astigmatism to reflected light that is reflected from the recording layer of the multi-layered optical information storage medium;
    a detector that detects light that has passed through the astigmatic lens system;
    a first segmented wave plate that is provided between a posterior focal line position of the astigmatic lens system for the reflected light from the recording layer and a posterior focal line position for reflected light from an adjacent layer that is further from the laser light source than the recording layer,
    the first segmented wave plate making polarization states of transmitted light from two regions of the first segmented wave plate be in a mutually orthogonal state;
    a second segmented wave plate that is provided between the posterior focal line position for the reflected light from the recording layer and the detector,
    the second segmented wave plate comprising wave plate regions that are the same as or are inverted relative to those of the first segmented wave plate; and
        an analyzer that is provided following the second segmented wave plate which transmits the reflected light from the recording layer; and wherein
    the astigmatic lens system is provided between the laser light source and the first segmented wave plate.

2. The optical pickup apparatus according to claim 1, wherein the direction of segmentation lines of the first and the second segmented wave plates is aligned with the direction of the posterior focal line for the reflected light formed by the astigmatic lens system.

3. The optical pickup apparatus according to claim 1, wherein the orthogonal state of the polarization states is an orthogonal state with respect to linear polarization.

4. The optical pickup apparatus according to claim 1, wherein the orthogonal state of the polarization states is an orthogonal state with respect to circular polarization.

5. The optical pickup apparatus according to claim 1, wherein
    the irradiation focusing optical system comprises an optical element that forms one main beam and two sub-beams from the laser light,
    the irradiation focusing optical system focuses each of the three beams on the recording layer of the multi-layered optical information storage medium, and
    one each of the first segmented wave plate, the second segmented wave plate, the analyzer, and a segmented detector are provided for reflected light of each of the beams.

6. The optical pickup apparatus according to claim 5, wherein
    all of the first segmented wave plates for the three beams are fabricated on a first composite segmented wave plate as one element, and
    all of the second segmented wave plates for the three beams are fabricated on a second composite segmented wave plate as one element.

7. The optical pickup apparatus according to claim 6, wherein the first composite segmented wave plate, the second composite segmented wave plate, and the analyzers are integrated into one element.

8. The optical pickup apparatus according to claim 5, wherein
    the first segmented wave plates form a first striped segmented wave plate that alternately alters polarization states of transmitted light to orthogonal states of polarization,
    the segmentation direction of the stripes of the first striped segmented wave plate is substantially aligned with the direction of the posterior focal lines of the reflected light formed by the astigmatic lens system,
    the segmentation positions of the stripes of the first striped segmented wave plate are aligned with the chief rays of the three beams,
    the second segmented wave plates form a second striped segmented wave plate that alternately alters polarization states of transmitted light to orthogonal states of polarization,
    the segmentation direction of the stripes of the second striped segmented wave plate is substantially aligned with the direction of the posterior focal lines of the reflected light formed by the astigmatic lens system, and
    the segmentation positions of the stripes of the second striped segmented wave plate are aligned with the chief rays of the three beams.

9. The optical pickup apparatus according to claim 1, wherein the first segmented wave plate, the second segmented wave plate, and the analyzer are integrated into one element.

* * * * *